Patented July 7, 1953

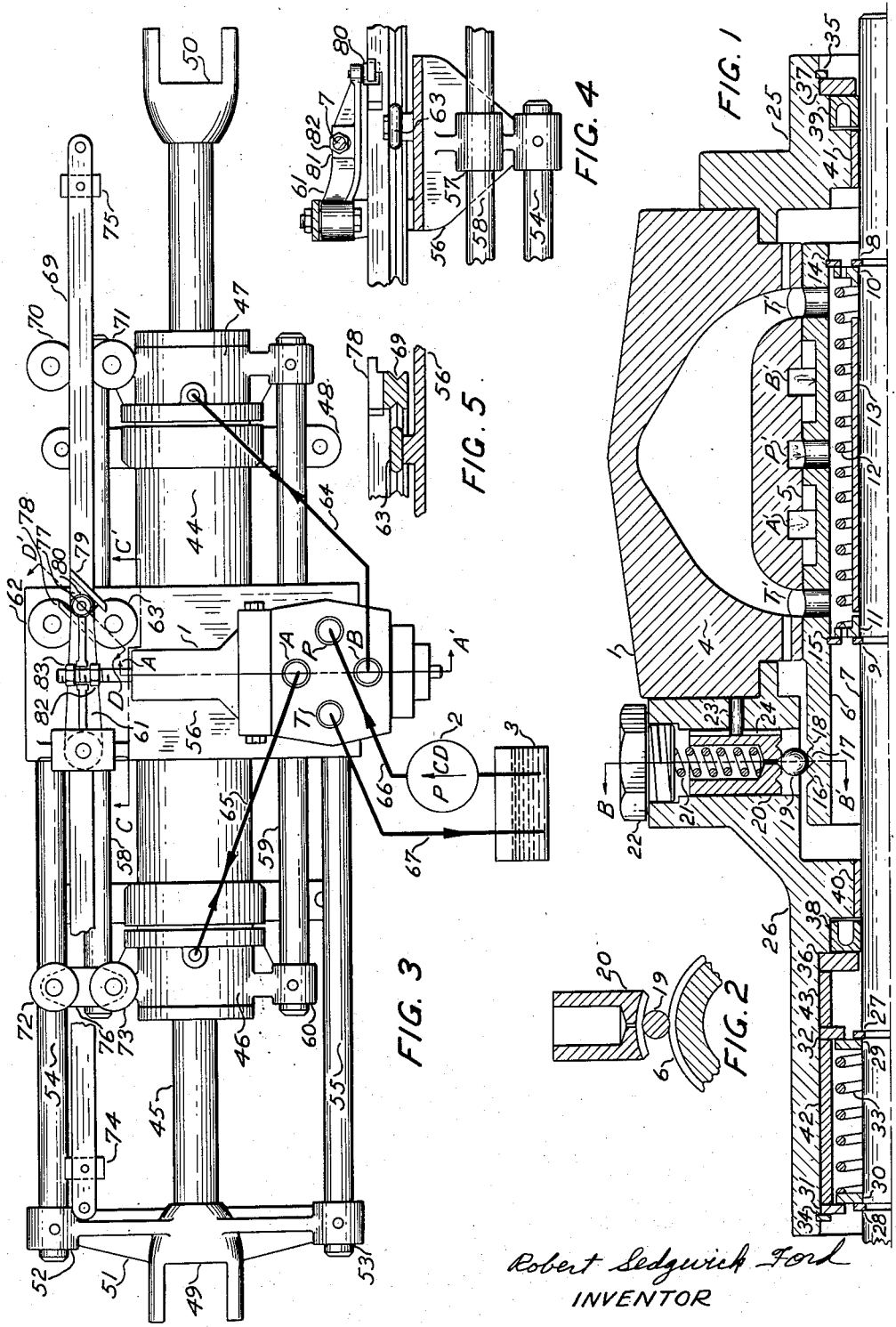

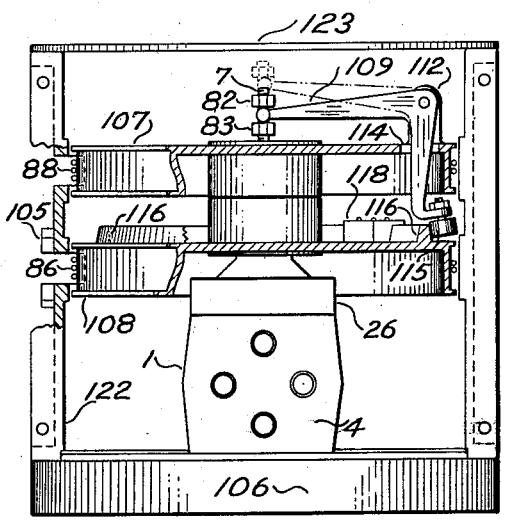

2,644,428

UNITED STATES PATENT OFFICE 2,644,428

POWER-OPERATED SERVO MECHANISM FOR USE IN STEERING GEARS AND THE LIKE

Robert Sedgwick Ford, Pascagoula, Miss.

Application September 17, 1951, Serial No. 246,890

3 Claims. (Cl. 121—41)

My invention relates to power operated servomechanism for use in steering gear and the like, wherein the manual effort applied by the pilot serves to control the application of power actuated forces to move and hold the rudder in synchronism with the manual control.

Servomechanisms of many types have long been used successfully in marine steering gear service, principally on the larger vessels wherein the need for power steering is imperative and the value of the ship warrants a large expenditure for steering gear. On these large vessels the previous ponderous and complicated steering gears are satisfactorily and relatively economical, however such steering gears are not suitable for the smaller vessels owing both to the cost being out of proportion with the value of the vessel and to the difficulty of maintenance wthout specially trained personnel. Due to this situation, there is a strong demand for simplified power steering gear for vessels such as tugs, patrol craft, minesweepers, fishing trawlers, and the like.

The broad object of this invention may therefore be stated as to provide improved and simplified power steering gear of minimum cost for small and medium sized vessels.

In brief, the invention consists of a novel hydraulic control valve, controlled by one of four optional species of follow-up apparatus.

Fig. 1 is a half section taken along line AA' in Fig. 3 showing the control valve.

Fig. 2 is a section taken along line BB' in Fig. 1 showing the detent saddle block, omitting the spring and retaining plug.

Fig. 3 is a plan view showing the control valve used with a saddle mounted follow-up apparatus on a hydraulic cylinder.

Fig. 4 is a section taken along line CC' in Fig. 3, showing the control lever mounting, with a portion of the lever pivot bracket broken away.

Fig. 5 is a section taken along line DD' in Fig. 3 showing the control bar and cam bar with the guide roller on the far side and the cam roller omitted for clarity.

Fig. 6 is a plan view of a marine steering arrangement with the cable drum type follow-up.

Fig. 7 is an elevation of the cable drum type follow-up unit with the near half of the housing removed, and with portions of the cable drums cut away to show the bell crank and cam arrangement. A portion of the housing center ribs on the left side is cut away to show the cable stop abutment.

Fig. 8 is a plan view of the cable drum type follow-up unit with the cover removed and portions of the housing and cable drums cut away for clarity.

Referring to Figs. 3 and 6, the typical fluid circuit used with the control valve 1 may be seen to comprise a continuous flow constant displacement pump 2 taking suction from a tank 3 and discharging through the control valve 1 back again to the tank 3, with a reversible fluid motor also connected to the control valve whereby the fluid flow through the valve may be directed into the motor to operate it as a power source to move the rudder. Incidental items such as relief valves, strainers, check valves, tank vents and similar items not necessary to the description of the invention have been omitted for clarity, but should be installed as dictated by accepted engineering practice. The pump may be driven by any suitable power source, such as electric motors, direct drive from main or auxiliary engines, or even by hand in emergency. Various auxiliary and emergency circuit modifications involving additional pumps for standby service may be used as required by certain marine regulations, but the circuit shown herein is considered basic in describing the invention.

Referring to Figs. 1, 2, and 3, it may be seen that the control valve comprises a body 4 provided with a ported internal bore 5 which contains a grooved and ported spool 6. The body ports marked A', B', P', and T' communicate respectively with external connections, namely the cylinder connections A and B, the pressure inlet P and the outlet to tank T. This body and spool porting gives a standard type of valving action well known in the art as four way through center action, whereby with the spool centered connections A and B are blocked and connection P is open to T. With the spool offset to the right, connection P is open to A and B is open to T. With the spool offset to the left P is open to B, and A is open to T. Thus when the spool 6 is centered the fluid motor is locked at a standstill by the blocking of connections A and B, and the pump discharge recirculates freely to tank under negligible pressure. When the spool is offset by a movement of the steering control, fluid is directed to the fluid motor to operate it under power in a corresponding direction. Thus the pump operates under negligible pressure during periods when the rudder is not being moved, and develops pressure only when the spool is offset to move the rudder.

Referring again to Fig. 1, it may be seen that the operating stem 7 is not connected rigidly to the spool 6, but transmits force to the spool through a spring and stop arrangement. This stem 7 passes through the center of the hollow spool 6 and is fitted with snap rings 8 and 9 engaging grooves in the stem. Two perforated shoulder washers 10 and 11 are fitted loosely around the stem, and form abutments for the spring 12 also encircling the stem. The sleeve 13 loosely fitted around the stem forms a rigid spacer for the shoulder washers to abut against. Snap rings 14 and 15 are imbedded in the spool. The spool 6 is provided with three circumferential grooves 16, 17 and 18 at one end beyond the valving portion, which grooves are engaged by a freely rolling ball 19. A cylindrical detent block 20 provided with three corresponding grooves is shown in Figs. 1 and 2. This block 20 is held down resiliently against the ball 19 by a spring 21, which is retained by a screwed plug 22. The block is oriented by a pin 23 engaging a slot 24. A similar detent assembly located on the opposite side of the valve operates in conjunction with the detent shown to balance the sidewise forces on the spool. This arrangement provides a three position detent of remarkable durability and sensitivity, owing to the action of the ball being free rolling rather than dragging from one groove to the next as in previous detents. In operation this detent serves to retain the spool in one of the three positions until it is forced to another position. Overtravel of the spool beyond the useful range is prevented by the ends of the spool abutting against the end caps 25 and 26.

To study the valve operation, when the stem 7 is moved by external force to the right the first portion of the stroke serves only to compress the spring 12 between washers 10 and 11, washer 10 remaining stationary against snap ring 14 and thus transmitting spring force to the spool. Snap ring 9 pushes against washer 11 which in turn pushes against the spring 12. Upon completion of the spring compressing portion of the stem stroke, sleeve 13 abuts against washer 10 at one end and against washer 11 at the other, completing a rigid connection system between stem and spool. Further motion of the stem 7 forces the spool free from the detent ball 19, whereupon the spool is quickly moved to the next position by the energy stored in the spring 12 in the compressive portion of the stem stroke. By this combination of spool detent and sequential action between stem and spool first of spring loading then positive thrust, a valve action free of throttling is obtained. The spool can never remain stationary at any position other than one of the three detented positions, and must move quickly from one position to another. The object of this type of action is to insure positive unloading of the pump pressure after a rudder motion, causing the rudder to be held by locked fluid motor action rather than by continuous pump pressure, thus saving power and preventing fluid overheating.

Referring again to Fig. 1, snap rings 27 and 28, washers 29, 30, 31, and 32, and spring 33 form a stem spring centering device well known in the art whereby the stem is returned to the center position by spring force after being offset in either direction. This spring 33 is considerably stronger than the combined effective strength of both spring 12 and the detent, so that it is capable of returning the spool to center after an offsetting motion. Snap rings 34 and 35, washers 36 and 37, seals 38 and 39, and bushings 40 and 41 serve as end closures to support the stem and seal it against leakage. Sleeves 42 and 43 serve as spacers to locate washers 31 and 32. It should also be noted that the stem may be overstroked in either direction almost 100% of the operative stroke, the excess stroke merely recompressing spring 12 after the spool 6 has shifted.

Figs. 3, 4, and 5 illustrate the use of the valve in a hydraulic servomechanism combining valve, follow-up apparatus and reciprocating fluid motor in one unit to give full motion storage servo action. The fluid motor is a conventional double acting hydraulic cylinder comprising a cylinder barrel 44, a double ended piston rod 45 attached to a piston fitted inside the cylinder barrel, and heads 46 and 47 fitted at either end with mounting feet as at 48. The ends of the piston rod 45 are fitted with clevises 49 and 50 to which the rudder cables or chains may be attached in a manner well known in the art, whereby the motion of the piston rod may be transmitted to move the rudder. A yoke 51 secured to the left hand clevis 49 is rigidly connected by means of pinned socket joints 52 and 53 to reciprocating rods 54 and 55 on either side, whereby the rods are moved back and forth with the power piston rod 45. These rods 54 and 55 are similarly attached at their opposite ends to the control saddle 56, which is thereby moved back and forth with the piston rod 45. The control saddle is guided and supported by means of sliding guide bushings as at 57 in Fig. 4 on each side, which engage and slide on stationary rods 58 and 59, which in turn are supported at each end by pinned socket joints as at 60 attached to the heads 46 and 47. This movable control saddle carries the control valve 1, the pivot of control arm 61, and the guide rollers 62 and 63. The valve is connected by flexible hoses 64, 65, 66, and 67 to the cylinder heads and to the pump 2 and tank 3. A control bar 69 having a V groove milled in each side is supported by six rollers 62, 63, 70, 71, 72, and 73, the last four of which are mounted on the cylinder heads 46 and 47, and the first two on the control saddle 56 as above stated. These rollers have rounded rims, and guide the bar 69 by engaging the side grooves. The bar 69 is drilled at each end for connection of the control cables, which may be connected to a steering wheel or lever in a manner well known in the art, whereby the motion of the helmsman may be transmitted to the control bar to cause a corresponding movement of the rudder under power. Blocks 74 and 75 bolted to the control bar are adapted to strike abutments on the cylinder head as at 76 and thus limit the stroke to the desired range. A notch cut across and partially through the control bar at 77 forms a seating for two oblique cam bars 78 and 79 which are silver brazed in place, leaving an open gap between the bars slightly wider than the diameter of the cam follower roller 80. The cam follower roller 80 is rotatably secured to the control arm 61 and adapted to lie in the gap between the cam bars when in the neutral position. The control arm is operatively connected to the valve stem 7 by an open yoke 81 on the arm loosely engaging two self locking nuts 82 and 83 threaded on the stem 7. In operation, when the control bar 69 is moved to the left, the roller 80 travels outward on the cam bar 79 and along the far side of the control bar for as long a distance as the control bar is moved. The control arm 61 being attached to the roller 80, the arm is swung counter-clockwise, thus pulling the stem 7 outward and offsetting valve spool 6 to direct fluid flow into the fluid motor for piston rod motion to the left. The control saddle 56 with valve 1 and control arm 61 moves along with the piston rod, and when the roller 80 overtakes the notch 77 in the control bar, it drops back to neutral position, whereupon the valve spool 6 is recentered, and the motion ceases. Movement of the control bar 69 in the opposite or right hand direction produces analogous results, the roller 80 moving to the near side of the bar and offsetting the valve spool 6 for motion to the right.

The projecting tips of the cam bars 78 and 79 serve to guard against the roller failing to enter the notch 77 should friction develop in the valve exceeding the strength of centering spring 33. Full motion storage control action of remarkable accuracy is obtained, because only a very slight movement of the bar 69 is necessary to actuate the valve, and the response stroke is 100% equal to the control stroke with no lag whatever. The control bar can be moved instantaneously full stroke, and the power response follows at its normal rate.

Figs. 6, 7, and 8, illustrate the control valve 1 used with a rotary cable drum follow-up control unit 84. In this typical arrangement the valve 1 is incorporated in the control unit 84 which is mounted separately from the fluid motor 85. A small cable 86 leading from the steering wheel 87 to the control unit 84 transmits the input control motion, and a similar cable 88 leading from the quadrant 89 to the control unit 84 transmits the rudder motion to the control unit for follow-up synchronization. Cable sheaves as at 90 are provided as required to carry the cable. The fluid motor 85 is a conventional double acting hydraulic cylinder pivotally connected at the head end to a fixed anchor 94 and at the rod end to the tiller 95, whereby the rudder stock 96 is rotated when the piston rod 97 moves back and forth. Flexible hoses 98 and 99 connect the fluid motor to the control valve 1, and pipe lines 100 and 101 connect the control valve to the pump and tank 3. Stop blocks 102 and 103 are clamped to the input cable 86 to limit the total travel to the desired range by striking the abutment lugs 104 and 105 on the control unit 84.

The construction of the control unit 84 may be studied in detail from Figs. 7 and 8. The body 4 of control valve 1 is bolted vertically to a base plate 106 which serves also as a valve end cap, and the upwardly projecting barrel of the other end cap 26 serves as a bearing journal on which two cable drums 107 and 108 are rotatably mounted. The valve stem 7 projects above the upper drum 107 and carries two self locking nuts 82 and 83 which abut against the slotted end of bell crank 109 embracing the stem 7. The bell crank is pivotally supported on the upper drum 107 by nut locked taper pivot studs 110 and 111 engaging sockets in the bell crank 109 and threaded through lugs 112 and 113 extending upwardly from the drum 107. The vertical arm of the bell crank 109 extends downwardly through a hole 114 in the upper drum 107, and the lower extremity is fitted with a cam follower roller 115. The bell crank is thus adapted to be oscillated by forces applied to the roller 115, and to operate the valve stem in or out corresponding to the motion of the roller. Rotary motion of the bell crank along with the upper drum does not directly affect the valve stem due to the coaxial stem connection at 82 and 83. The lower drum 108 is fitted with a raised annular rib 116 which is continuous for the full circle except where notched through for the insertion of cam blocks 117 and 118 riveted to the cable drum 108 leaving a gap 119 between the blocks. These blocks and the annular rib form a cam system adapted to actuate the cam follower roller 115. The roller is illustrated in a position on the outside of the rib 116, but its operating path in other relative positions of the two cable drums leads also back through the gap 119 and throughout both the inside and outside surfaces of the rib 116 as indicated in phantom style in Fig. 8. Due to the stem centering spring 33 in the control valve, the neutral position of the roller is in the center of the gap 119, and when the roller is displaced to either the inside or outside of the rib 116, the spring centering action causes it to follow the rib closely, so upon reaching the gap the roller will enter it under spring force. The cam blocks 117 and 118 are extended on either side to form guarding lugs to insure that the roller can never pass the gap without entering it, in the event of the valve action becoming sluggish. The square rear edges of these cam blocks serve as abutments for the roller 115 to stop against on completing one turn of relative motion in either direction from neutral between cable drums so as to prevent the roller entering the gap from the wrong direction and thus throwing the input and response out of synchronism. To prevent destructive impact at this point elastic shock pads 120 and 121 are secured to the cam blocks for the roller to strike against. Such striking of the roller against these stops would not occur in normal practice, because the external cable stops would strike first. The cables 86 and 88 are wound around the cable drums 107 and 108 respectively and secured at the center point to prevent slippage. For the utmost reliability the cable drums may be provided with individual cable grooves instead of the open drums shown. To protect the apparatus and retain the cables in place an external shell 122 is fitted around the assembly and provided with a cover 123. This shell 122 is made in halves and notched as at 124 to permit installation after the cables have been installed. An additional notch and abutment lugs on the opposite side may be provided for greater installation versatility.

In operation, the control valve spool 6 is in centered position and the fluid motor is motionless when the roller 115 is in the gap. A rotational movement of the lower drum 108 in response to a steering wheel movement forces the roller 115 out of the gap onto the surface of rib 116 either outside or inside depending on direction of the motion. This roller motion tilts the bell crank 109 and offsets the valve stem 7, positioning the control valve spool 6 to direct hydraulic power into the fluid motor to actuate the rudder in the corresponding direction. The rudder motion is transmitted to the upper drum 107 and when it has duplicated the original movement of the lower drum the roller enters the gap and brings the control valve spool back to center, whereupon the rudder is stopped and held stationary by hydraulic lock in the fluid motor 85. It is thus seen that the valve action is governed by relative motion between the two drums 107 and 108.

In normal use the rudder quadrant 89 is so proportioned as to provide slightly less than one revolution of the upper cable drum in moving from hardover to hardover and the stops 102 and 103 are set to limit the lower cable drum travel so as to bring the middle of the gap 119 to the roller 115 at each hardover position. This affords 100% motion storage, and will prevent the roller 115 from striking the shock pads 120 and 121. With twelve inch cable drums, a total cable travel of approximately three feet is thus provided, which is ample for most applications. Additional cable travel can be secured practically without limit by allowing the drums to rotate together through an increased working range of several turns, however the dimensional amount of motion storage remains constant, and in such installations only partial motion storage would be obtained. It is evident that this control unit is also suitable for use with other types of valves, and also with electric switches used instead of valves in electrically controlled servo apparatus.

I claim as my invention:

1. In a servomechanism control apparatus, the combination of a rotatable disk, an annular concentric rib secured to the disk and provided with a notch through the rib, a cam follower adapted to travel along the inside and the outside surface of the rib and to move from one side to the other by passing through the notch, power controlling means operatively connected to the cam follower whereby the motion of the cam follower in passing through the notch operates the power controlling means, a pair of oblique cam blocks secured to the disk in the rib notch with the cam blocks projecting alternately from either side of the rib with a gap between whereby the cam follower is guided through the gap and prevented from entering the gap from the wrong side, means whereby the said disk may be rotated with respect to the cam follower, and means whereby the cam follower may be carried in a circular path following the said rib.

2. In a servomechanism control apparatus, the combination of a cable drum, an annular concentric rib secured to the drum face and provided with a notch through the rib, a cam roller adapted to travel along the inside and the outside surfaces of the rib and to move from one side to the other by passing through the notch, a pair of oblique guide blocks mounted in the notch whereby the roller is guided through the notch, a bell crank supporting the cam roller and adapted to be oscillated by the motion of the cam roller, a second cable drum mounted coaxially with the first cable drum and pivotally supporting the said bell crank whereby the bell crank and roller may be carried in a circular path following the said rib, power controlling means operatively connected to the said bell crank whereby the motion of the cam roller in passing through the notch operates the power controlling means, power actuating means operatively connected to the second cable drum and controlled by the said power controlling means whereby the second cable drum is power driven to follow the motion of the first cable drum and to cease motion when the cam roller reaches the center of the notch, all arranged and adapted to control the action of the power actuating means.

3. An apparatus as in claim 2 wherein the connection between the bell crank and the power controlling means is mounted coaxially with respect to the cable drums whereby rotation of the drums does not interfere with operation of the connection to the power controlling means.

ROBERT SEDGWICK FORD.

References Cited in the file of this patent

UNITED STATES PATENTS

| Number | Name | Date |
| --- | --- | --- |
| 334,238 | King | Jan. 12, 1886 |
| 662,358 | Grossman | Nov. 20, 1900 |
| 730,667 | Linn | June 9, 1903 |
| 1,935,234 | White | Nov. 14, 1933 |
| 2,361,801 | Towler | Oct. 31, 1944 |
| 2,451,730 | Greenlee | Oct. 19, 1948 |
| 2,547,552 | Anderson | Apr. 13, 1951 |
| 2,566,273 | Westbury | Aug. 28, 1951 |
| 2,594,664 | Livers | Apr. 29, 1952 |